Jan. 19, 1943. J. H. GRAHAM 2,308,750
SPRING SUSPENSION FOR WHEELED VEHICLES
Filed Dec. 21, 1940 2 Sheets—Sheet 2
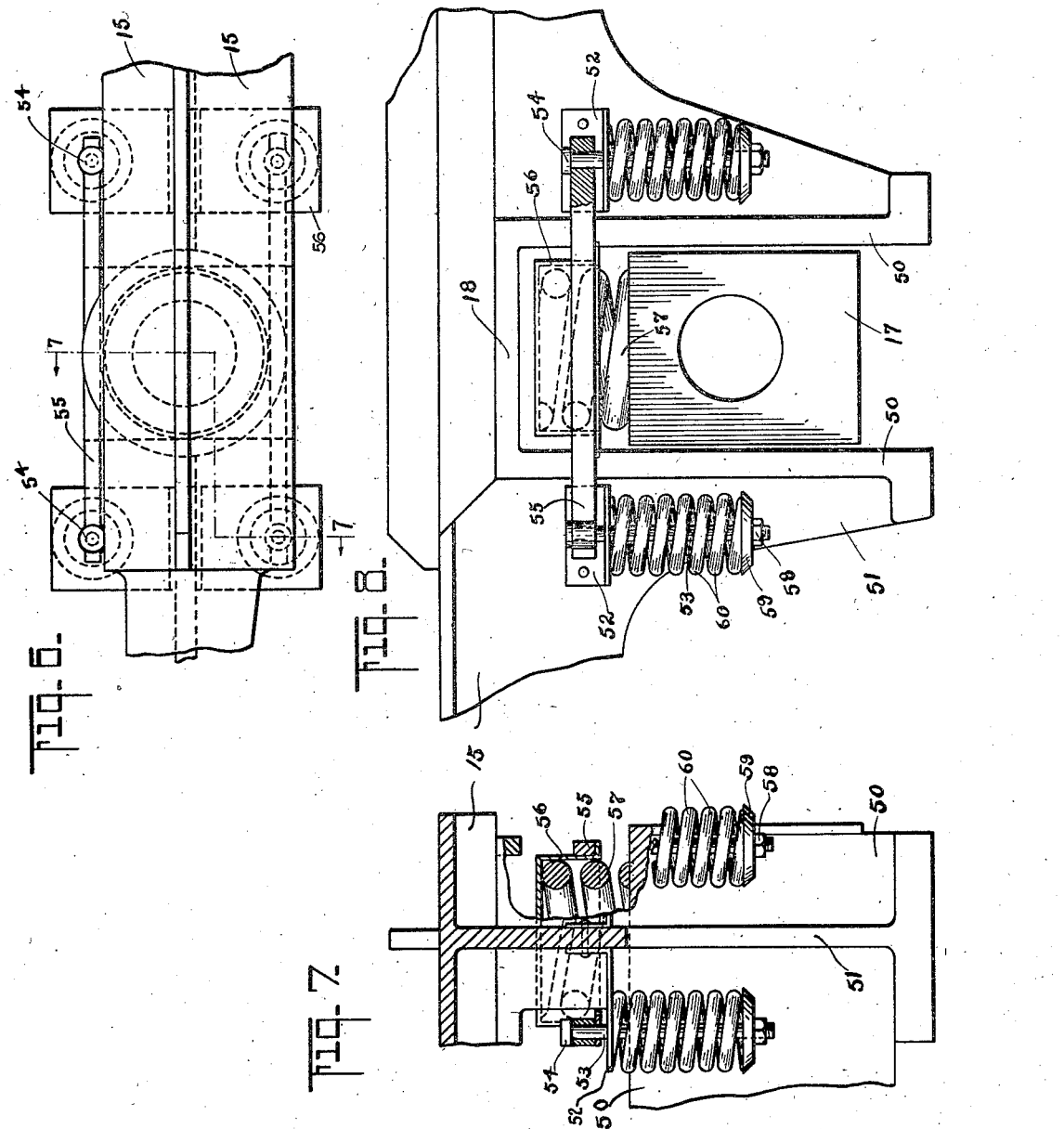
INVENTOR
John Hector Graham
BY
Warren E. Willis
ATTORNEY Patented Jan. 19, 1943

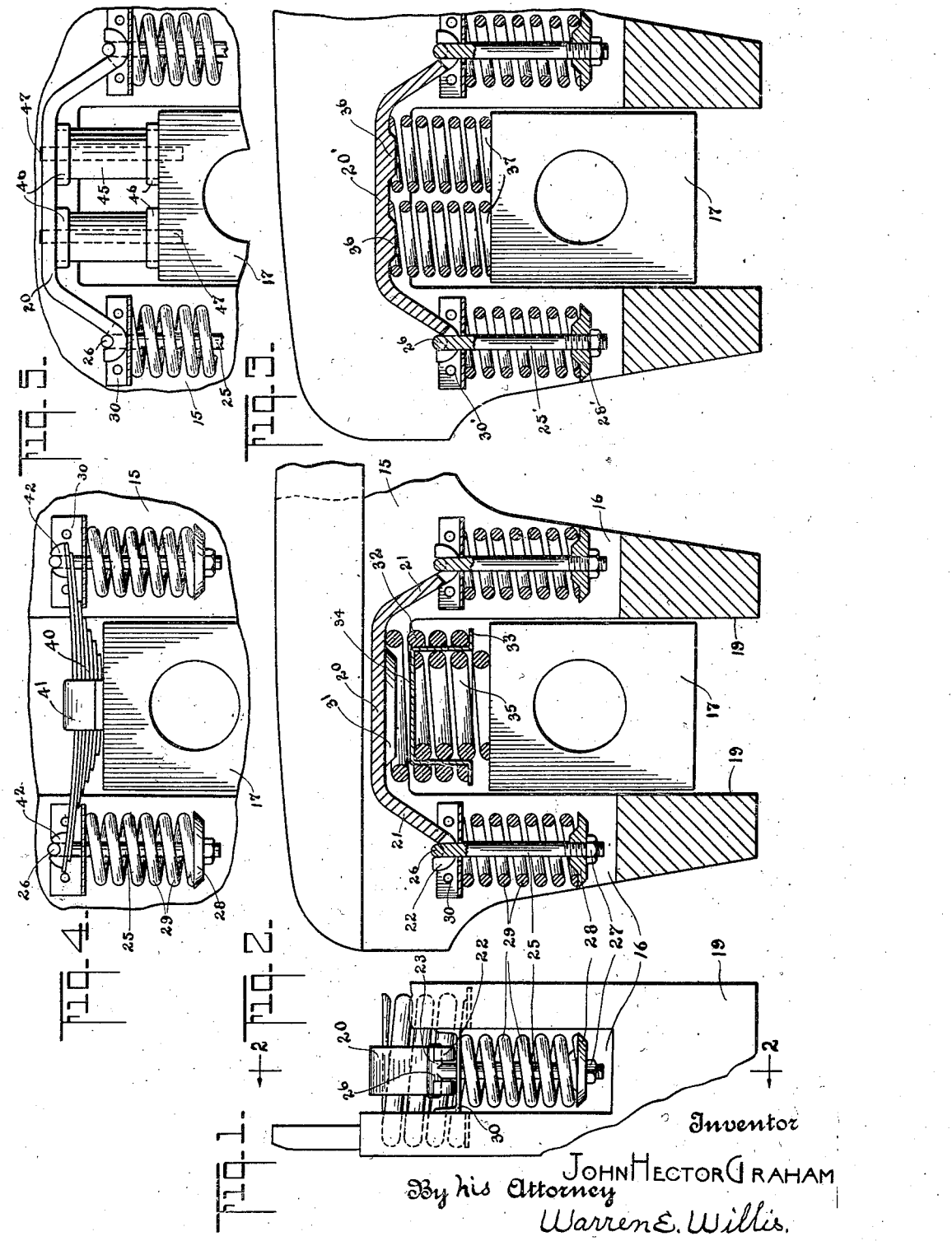

2,308,750

UNITED STATES PATENT OFFICE 2,308,750

SPRING SUSPENSION FOR WHEELED VEHICLES

John Hector Graham, New York, N. Y.

Application December 21, 1940, Serial No. 371,076

3 Claims. (Cl. 267—4)

This invention relates to improvements in resilient mountings for the saddles or bolsters of heavy wheeled vehicles, as trucks, etc., and more particularly to types as used in rail and highway vehicles.

Since builders of wheeled vehicles have been using springs of any kind, they estimated the weight to be supported on the springs, and the maker of the springs guessed or roughly calculated springs thought to be suitable for the load, this being the present prevailing method.

Expressed in simple terms, the riding quality and stability of a wheeled vehicle at high speed is dependent on the manner in which the weight of the vehicle is distributed over the length of the wheel base under initial tension.

Engineers used the term "mass," when referring to the entire gross weight, which consists of "sprung weight" and "unsprung weight"; sprung weight being the total weight of all parts supported by the springs, and unsprung weight, the items not supported on springs, but forming parts of the vehicle.

It is axiomatic that the vehicle with relatively great unsprung weight will ride harder than one with a less unsprung weight.

Having these matters in mind, it has been an object of this invention to provide a series of multiple springs, preferably helical—because of the lesser space occupied—so arranged as to interpose their resilient effect between the axle boxes and their housings, by initial tension, in a manner to minimize, reduce and absorb, in an unusually effective manner, all jars, shocks and vibrations caused by an uneven road bed, rail joints, track imperfections, irregularities in the rotundity of the vehicle wheels and other defective conditions.

A further feature is in the provision of means whereby the resilient support structure may be made far lighter in weight than ordinary mountings as commonly employed, and occupy a minimum of space.

Another purpose is to produce a resilient mounting for trucks that is easily assembled or dismounted, possessed of adequate strength and is of good workmanlike appearance.

These and other advantageous objects, as will later appear, are accomplished by the novel design, construction and arrangement of parts hereinafter described and illustrated in the accompanying drawings, constituting an essential component of this disclosure, and in which:

Figure 1 is a fragmentary end elevational view of one embodiment of the invention, showing it as assembled in a truck pedestal.

Figure 2 is a sectional view taken on line 2—2 of Figure 1.

Figure 3 is a similar sectional view showing a modified arrangement of springs.

Figure 4 is a fragmentary side elevational view showing a combination of coil and leaf springs.

Figure 5 is a similar view of another modification in construction.

Figure 6 is a top plan view of another embodiment of the invention.

Figure 7 is a transverse sectional view taken on line 7—7 of Figure 6.

Figure 8 is a front elevational view of the same.

In all the several views are shown a portion of a conventional type of vehicle truck frame, designated generally by the numeral 15, the same having pairs of depending lugs 16, constituting forks, between which is slidably contained the usual axle box or journal 17, these elements being shown for the purpose of clarity only.

Ordinarily some form of spring, without initial tension, as double or semi-elliptic, or powerful helically coiled springs uncontrolled are interposed between the box 17 and saddle or bridge 18 between the forks, to afford some degree of resilience.

In the preferred type, indicated in Figures 1 and 2, the frame saddle 15 is bifurcated, presenting a space 19, disposed at a right angle to the opening for the journal 17, and arranged intermediate the side walls of this space is a yoke 20 having angularly downturned end portions 21 terminating in semi-circular up-turned forks 22 which contain central recesses 23.

Bolts 25, having T-shaped heads 26, pass through the recesses, their heads being seated in the forks 22 and their threaded shanks provided with nuts 27.

Above, and resting on the nuts, are strong disc washers 28, supporting helically coiled compression springs 29, under initial control, their upper ends abutting against channels 30 rigidly fixed to the side walls of the space 19.

The raised central portion of the yoke 20 has at its under side, a pad 31 positioned above the journal 17 to receive the thrust of a single, heavy helical spring 32, seated on the annular flange 33 of an inverted cup 34, which in turn receives the thrust of a similar but smaller helical spring 35, seated on the upper side of the box 17.

In the form shown in Figure 3, the yoke 20' has on the underside of its raised portion, integral pads 36 to enter the open, upper ends of a pair of helical springs 37 seated on the upper side of the box 17, all other parts being as previously described.

In the modification seen in Figure 4, a plurally layered leaf spring 40 is held by a central clamp 41 to the top of the journal box 17, the ends of the spring carrying seats 42 recessed to receive the T-shaped heads 26 of the bolts 25, which are arranged in the manner before described.

Figure 5 discloses a device similar to that shown in Figures 1 and 2, with the exception that blocks 45 of rubber, or even wood, are substituted for the springs 32—35, the ends of the blocks being provided with caps 46, held in place by rods 47 entering the upper end of the journal box 17, and passing through openings in the yoke 20.

In the further modified form, seen in Figures 6, 7 and 8, the arrangement is designed to be used in cases where the journal box 17 is disposed between lateral flanges 50 extending from webs 51 integral with the bolster frame 15.

In applying the springs to this type of construction, an opposed pair of brackets 52 are fixed on opposite sides of the web on both sides of the box 17, these brackets having outstanding flanges bored to act as guides for bolts 53 passing through them.

These bolts have heads 54 seated on the ends of yoke bars 55 carried on the outstanding flanges of channel shaped bolsters 56, disposed in the space above the boxes 17 and are pressed upwardly by strong helical springs 57 seated on the upper sides of the box.

The bolts 53 are provided with initially tensioning nuts 58 at their lower ends and resting on the nuts are washers 59 on which are seated the lower ends of helical springs 60, abutting the underside of the flanges of the brackets 52, materially aiding in supporting the load imposed on the frame 15.

This arrangement permits the application of the springs to truck frames now in use without change in their construction, merely the addition of the brackets 52 and details associated with them.

In operation, after the parts have been assembled, and before the vehicle frame is placed on the journal boxes 17, blocks of wood, or metal, are disposed on the boxes to hold the frame at a predetermined distance thereabove; then the initial tension nuts 27—58 are screwed upon the bolts 25—53 until the weight of the frame is lifted, by compression of the spiral springs 29—60, the blocks then being removed; the frame, "sprung weight" is now floating, no guess work.

The smaller helical springs 29—60 carry the empty vehicle and varying loads cause the springs to compress and expand with every rise and descent of the wheels as they move over the uneven plane of irregularities they are running on.

When the vehicle is empty, the springs 29—60 counteract its empty weight; when the vehicle is loaded, or partly loaded, the initial control is in these springs.

If the wheels pass over irregularities in the road bed these springs instantly act and follow every up-and-down movement of the wheels, while the vehicle body floats along with its contents perfectly poised.

It is to be understood that the invention is not confined to the use of helically coiled springs as any other form of spring may be substituted therefor without departing from the spirit of the invention.

It will be apparent that other modifications may be made to suit conditions without the exercise of invention within the scope and spirit of the claims.

Having thus described the invention, what is claimed as new and sought to secure by Letters Patent, is:

1. In combination with a wheeled vehicle structure comprising a body and truck, said truck including axle-boxes, rigid yokes disposed over said boxes, spring devices intermediate said boxes and yokes, means on said yokes to retain said spring devices in assembled position, pairs of spaced counterpoising springs at the ends of said yokes adapted to carry the vehicle body when empty and means to adjust each of said springs separately.

2. In combination, a wheeled vehicle structure comprising a body and chassis, said chassis including axle-boxes, yokes disposed over said boxes, spring devices comprising inner and outer coils intermediate said boxes and yokes, inverted cups having flanges disposed between said inner and outer coils, brackets on said body adjacent the ends of said yokes, bolts engaging the ends of said yokes and extending through said brackets, springs coiled around the said bolts abutting the under sides of said brackets, and means to adjust the initial tension of the last named springs to carry the empty weight of said body.

3. In combination with a wheeled vehicle frame having a bolster and journal box, a yoke disposed over said box and having upturned forked ends, brackets rigidly fixed on said frame at each side of said box, bolts having heads engaged by said yoke ends, said bolts extending through said brackets, washers slidable on said bolts, coiled springs surrounding said bolts, means for adjusting the compression of said spring to carry the unsprung weight of said vehicle, and helically wound springs intervening said box and yoke, one of said helically wound springs being of relatively greater diameter than the other and arranged circumjacent thereto.

JOHN HECTOR GRAHAM.